Patented Aug. 2, 1938

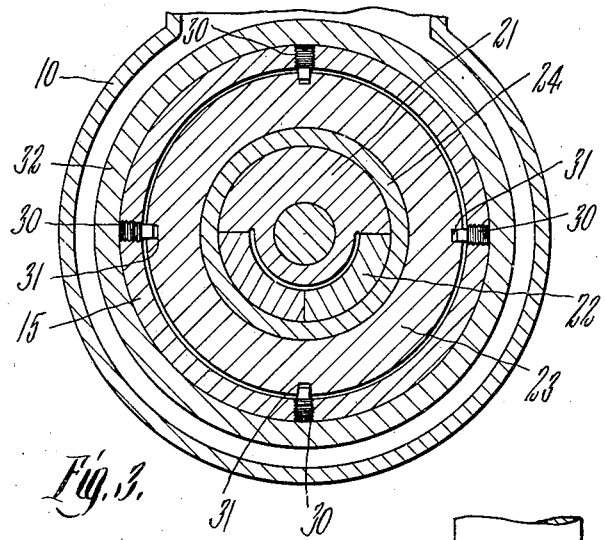
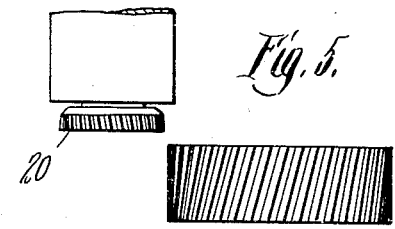
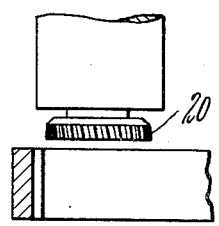
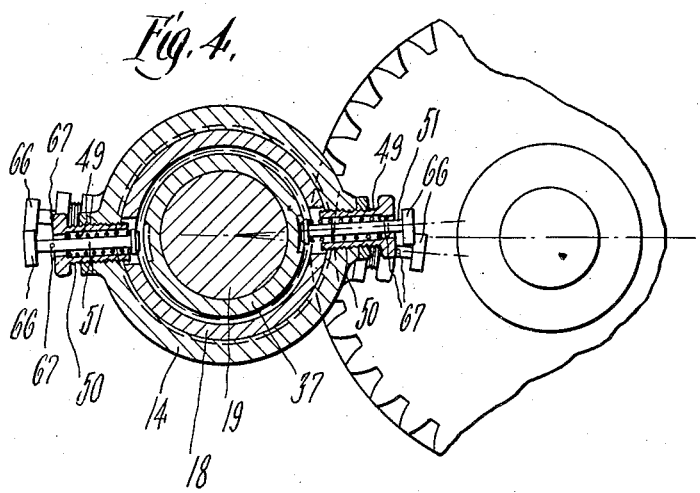
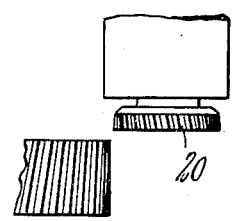

2,125,304

UNITED STATES PATENT OFFICE 2,125,304

CUTTER RELIEVING MEANS FOR SHAPING MACHINES

Edward W. Miller, Springfield, Vt., assignor to The Fellows Gear Shaper Company, Springfield, Vt., a corporation of Vermont Application July 21, 1936, Serial No. 91,665

16 Claims. (Cl. 90—9)

The present invention relates to gear shaping machines and equivalent machine tools of the type in which a cutter is carried by a reciprocative and rotatable spindle and is caused to act on the work piece by endwise movements of the spindle in one direction, and is returned, without performing any cutting action, by endwise movements of the spindle in the opposite direction. It is more particularly concerned with means or provisions for relieving the cutter, that is, effecting a relative separation between the cutter and work piece, after each cutting stroke so that it will not rub on the work piece during the return stroke, and replacing it in the line of cutting travel before each cutting stroke. Its object is to reduce to the minimum the total mass of the parts needing to be thus displaced in order to relieve the cutter and restore the working relationship between the cutter and work, to effect the movements of relief and restoration quickly and efficiently with the minimum of shock and vibration, and to control, and alter as needed for work pieces of different types, the direction in which the relief movements take place.

As the operating speeds of such machines have been increased in consequence of various improvements which have been put into effect from time to time, the problem of effecting a rapid and sufficient relieving and returning displacement of the cutter without shock and vibration has become more and more acute. Such movements must be effected in the brief period at the end of each stroke when the cutter is clear of the work. If it be assumed that the cutter makes 600 cycles per minute (each cycle consisting of one cutting stroke and one return stroke) and is clear of the work during one tenth of the cycle at the end of each stroke, then the relief movement must be effected within the span of one hundredth of a second, and the replacement movement in the same length of time. Even though these movements be short in distance, in the order of fifteen to twenty thousandths of an inch, nevertheless the suddenness with which they are effected, or with which the displaced part brings up against a rigid stop on its return, in the operation of the relieving means heretofore used, causes a shock productive of objectionable or harmful vibration and noise. With this background in mind the importance and difficulty of the problem which I have solved by this invention will be more readily appreciated. My solution, in a brief statement of its main features, consists in pivoting the spindle at the end through which it receives driving torque, in a manner permitting the opposite end, to which the cutter is secured, to move sidewise independently of the supporting structure; in displacing the spindle by continuous spring action against a gradually withdrawing abutment; and in returning the spindle and cutter to the cutting path by a wedging action progressively applied and without bringing it against an abrupt stop or abutment. The invention is fully and particularly explained in the following specification in connection with drawings which illustrate its principles in terms of one concrete embodiment thereof.

In the drawings,—

Figure 1:
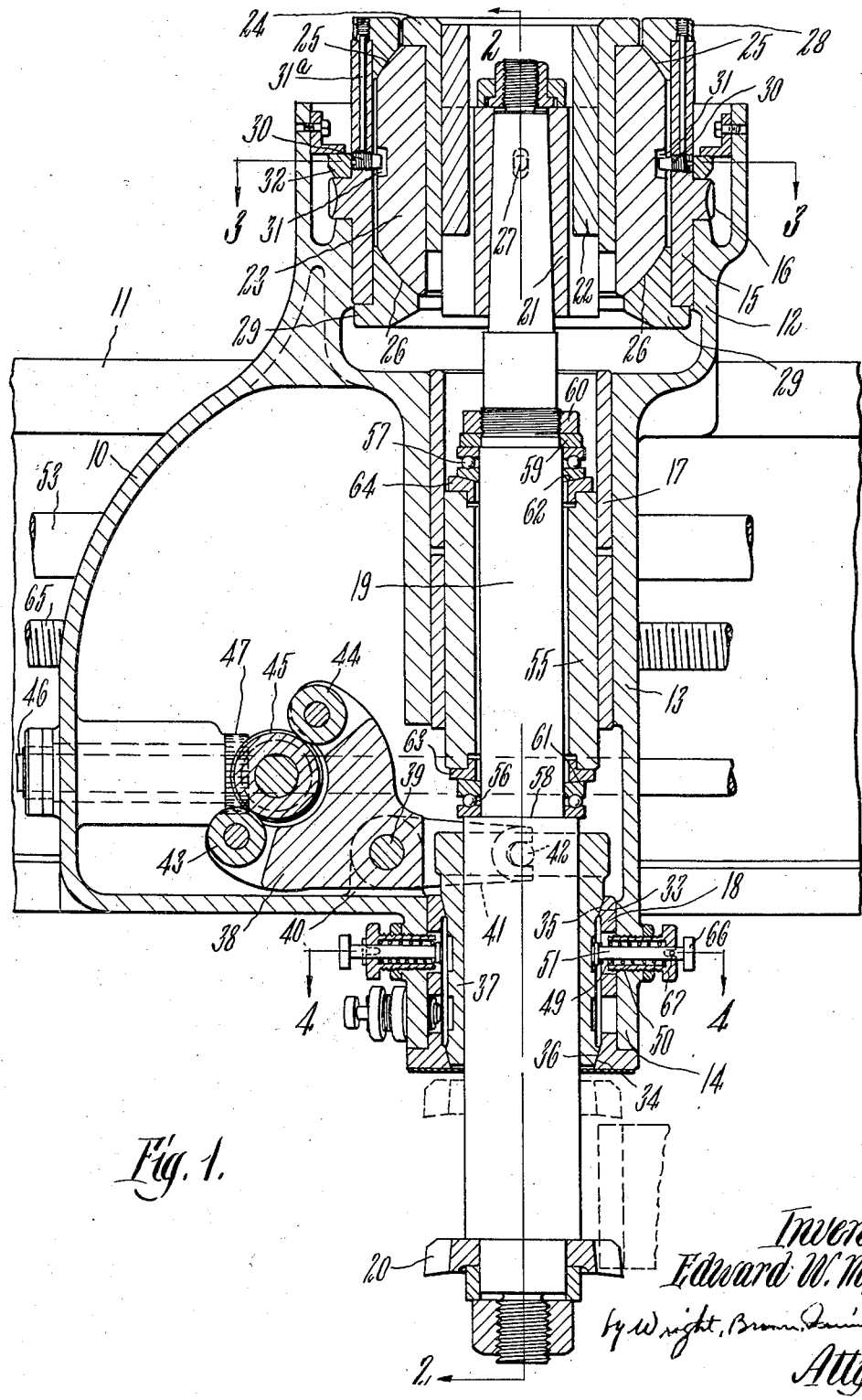
Fig. 1 is a vertical cutter carriage or saddle of a gear shaping machine of the Fellows type, with a representation in front elevation of a fragment of the frame or guide by which the saddle is supported adjustably.
Figure 2:
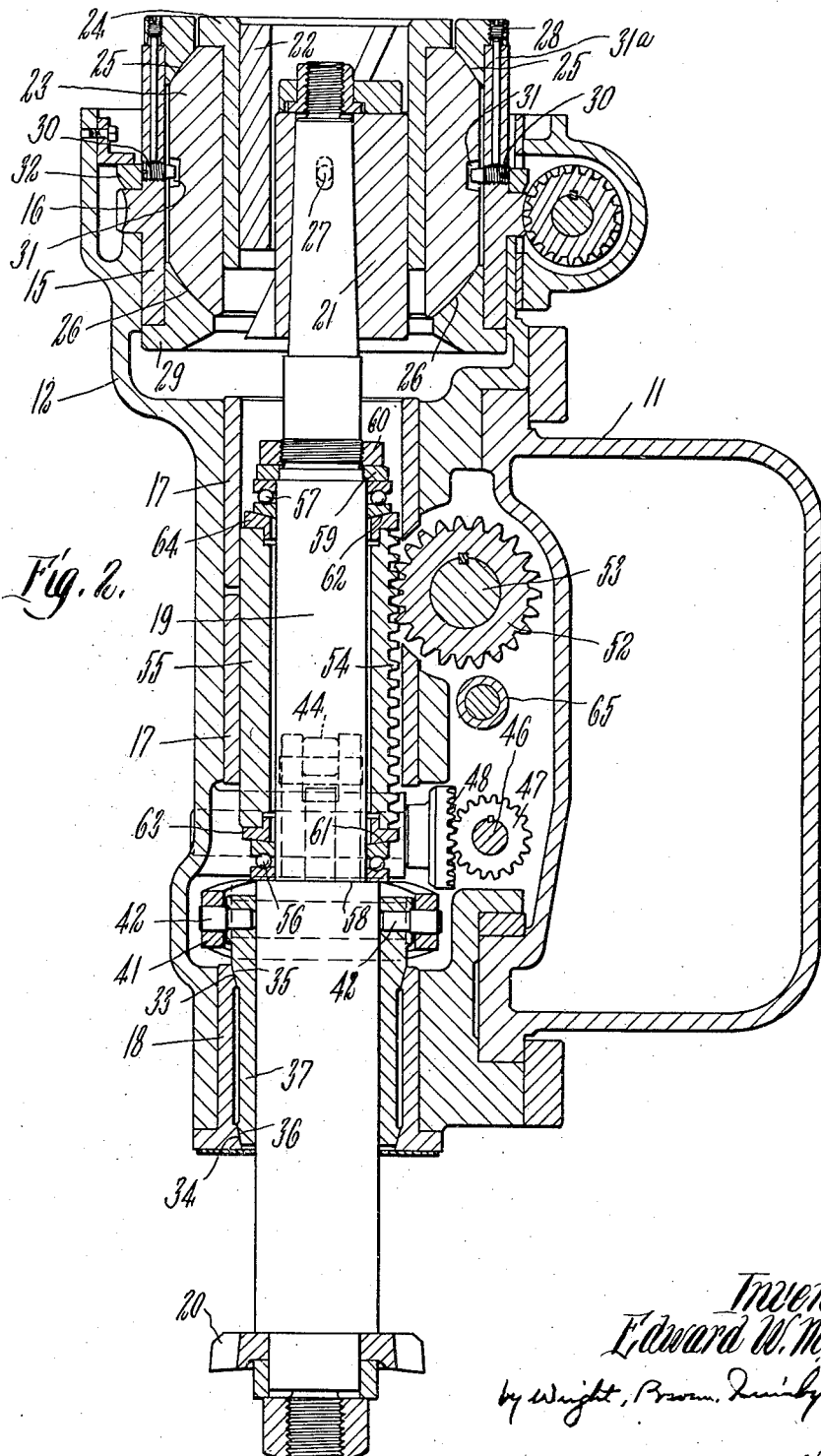
Fig. 2 is a section on a plane at right angles to that of Fig. 1 passing through the line 2—2 of Fig. 1.

Figs. 3 and 4 are detail horizontal sections on lines 3—3 and 4—4 respectively of Fig. 1;

Figs. 5, 6, 7 and 8 are sketch drawings illustrating different possible relationships between the cutter and work piece for cutting external and internal gears, explanatory of the provisions, which constitute one feature of the invention, for controlling and varying the directions of the cutter relieving movements.

Like reference characters designate the same parts wherever they occur in all the figures.

10 represents a cutter carrying saddle of the same general type as that shown in the patent of Edwin R. Fellows No. 676,227, which is supported and adjustable on a guide 11 having sufficient length to permit placement of the cutter spindle at either side of a work spindle for generating either external or internal spur or helical gears. It typifies and represents a saddle or holder of any design suitable to accommodate the spindle and spindle operating means hereinafter described. The saddle structure includes alined guides 12, 13 and 14, in which are respectively mounted the hub portion 15 of a so-called index wheel 16, a bushing or liner 17 and a sleeve 18. The index wheel 16 is a gear element, which may be either a worm gear driven by a worm or a spur or helical gear driven by a pinion, by which rotation at a relatively slow rate is imparted to the cutter spindle 19 for causing the toothed cutter 20 on the protruding end of the spindle to generate conjugate teeth in a work piece, in the well known manner. Complemental guide members 21 and 22 are connected to the spindle and index wheel respectively for transmitting such rotation while permitting independent reciprocative movement of the spindle. These guides are of the general character of the said Fellows patent and have complemental abutting edges which may be parallel to the axis of the spindle or helically curved around such axis, according as the machine is set up to generate straight toothed or helical gears. They are detachably mounted to permit substitution for one another of straight and helical guides and guides of different helical leads.

One new feature of the invention consists in connecting means between the spindle and index wheel organized to permit angular displacement of the spindle about any axis in a plane perpendicular to its own axis. The herein illustrated embodiment of such connecting means consists of a truncated sphere 23 having a diametral passage in which is mounted the sleeve 24 to which the outer guide member 22 is secured, and having external spherical zones 25, 26, the center of which lies in the axis of the spindle at the point 27. Bearing rings 28 and 29 complemental to the zones 25 and 26 respectively are mounted in and secured to the opposite ends of the index gear hub. These members constitute a ball and socket joint permitting swinging movement of the spindle in any direction about the center 27 without varying the engagement of the complemental guides with one another, since both guides partake equally of such oscillative movements of the spindle. In order not to make the index gear of excessively large diameter, the exterior of the ball member or truncated sphere is shaped cylindrically instead of spherically, with a diameter great enough only to provide sufficient width of spherical bearing and to accommodate a flange at one end of the sleeve 24; and the internal diameter of the gear hub is made enough larger to give clearance for the swinging movement which suffices to relieve the cutter.

The index gear carries pins 30, here shown as four in number equally spaced around its circumference, all in one plane through the center 27 and perpendicular to the spindle axis when in its cutting position, which pins enter slots 31 in the exterior of the ball member 23. Such slots fit the pin extremities in the plane above referred to, (which is the equatorial plane of the ball member) but extend to either side of the pins in planes perpendicular thereto; i. e., meridional planes of the ball member or axial planes of the spindle, whereby rotation is transmitted to the spindle without backlash and transverse angular displacement of the spindle is permitted. These pins are adjustable radially to compensate for wear and for that purpose may be threaded through the hub of the index gear and clamped by set screws 31a. The outer thrust bearing ring 32 for the index wheel is removable to permit access to the pins when adjustment is required.

The spindle is centered in its cutting position and displaced to relieve the cutter, by the conjoint action of wedging surfaces and a spring. Two pairs of complemental wedging surfaces are here provided, consisting of internal abutment or reaction zones 33 and 34 in the ends of the sleeve 18, and external conical zones 35 and 36 on a sleeve 37 which surrounds the spindle and has a close sliding fit thereon. The zones 33 and 34 are preferably cone surfaces complemental to the zones 35 and 36; and all such surfaces are tapered convergently in the same direction so that those on the movable sleeve 37 are equally withdrawn from and entered into those in the fixed sleeve 18 by displacement of the movable sleeve in opposite directions. A sleeve actuating lever 38 is pivoted by a fulcrum pin 39 between lugs 40 in the cutter saddle. It has a forked arm 41, the branches of which embrace one end of the movable sleeve 37 and are notched or slotted to receive pins 42 mounted in the sleeve and projecting from opposite ends of a diameter thereof. Said lever has a second forked arm, the branches 43 and 44 of which embrace a cam 45 and carry rolls or equivalent contact members which bear simultaneously on the cam at diametrically opposite points of the latter. The cam is rotated in time with the reciprocations of the spindle so as to make one complete rotation of each cycle of spindle movements; such cycle consisting of one working stroke and one return stroke. The circumference of the cam comprises a high dwell and a low dwell, each subtending nearly 180° of arc, joined by short rises or descents, and so related to the spindle movement as to cause withdrawal of the sleeve 37 when the cutter emerges from the work at the end of its cutting stroke, and advance of the sleeve when the cutter is clear of the work at the end of its return stroke. An illustrative means for driving the cam consists of a shaft 46, a pinion 47 splined on the shaft, and a crown gear 48 secured to a shaft of the cam in mesh with pinion 47.

A suitable type of spring for cooperating with the wedging surfaces is shown illustratively here as a helical spring 49 confined within a sleeve 50 threaded into the part 14 of the saddle, radially to the spindle. A plunger 51 is surrounded by the spring and pressed upon thereby so as to exert force constantly against the side of sleeve 37. Hence when and as this sleeve is withdrawn, the spring maintains a constant contact between the complemental wedging surfaces at the opposite side of the spindle, causing displacement of the spindle in the direction of thrust to the extent and as rapidly as permitted by the receding surfaces. And the spring yields when the movable sleeve is advanced, until the wedging cone surfaces come to an even bearing all around the spindle. By virtue of such wedging and spring action, and the simultaneous engagement of the operating lever 38 with opposite sides of the cam, and with the provision of adjusting means, if need be, to take up wear and backlash between relatively movable contact surfaces, the displacement movements of the spindle and controlling means are initiated and arrested without shock. The taper of the complemental conical surfaces is intermediate that which would cause binding or seizing, and that of which the reaction under thrust of spring 49 would tend unduly to retract the movable sleeve.

Reciprocating movement is imparted to the spindle by a gear 52 splined on a shaft 53 and meshing with a rack, or a series of rack teeth, 54 on one side of a sleeve 55 which has a sliding bearing within the bushing or liner 17. Endwise movements of the sleeve in both directions are transmitted to the spindle through thrust bearings 56 and 57, which may be ball bearings, at opposite ends of the sleeve. The thrust bearing 56 abuts against a shoulder 58 on the spindle and bearing 57 against a collar 59 on the spindle which is backed up by a nut 60. That part of the spindle which passes through sleeve 55 is enough smaller in diameter than the interior of the sleeve to permit or accommodate the cutter relieving movement of the spindle, and engagement of the thrust bearings with the sleeve is made through spherical surfaces 61 and 62 concentric with the center 27. Such surfaces on the sleeve are preferably formed on separate rings 63 and 64 suitably fitted and secured to the sleeve.

As the sleeve 55 does not partake of the lateral movements of the spindle, but is held to an invariable rectilinear path by its external bearing, such spindle movements do not cause any change in the character of mesh between the gear 52 and rack 54, or require the provision of any backlash between these gear elements to permit of such movements. All of the members and elements which are directly associated with the spindle are coaxial therewith when the spindle is in its cutting position. Hence its lateral relieving movement is free, unimpeded, and of invariable character in all of its positions of rotation about its own axis.

The shafts 46 and 53, as also a screw 65 for propelling and locating the cutter saddle on the supporting guide 11 are parallel to the latter and pass through suitable bearings, or a nut, respectively, in the saddle. They may be supported and rotated or oscillated by any suitable means and mechanism, the description of which is not necessary to an explanation of the present invention, and as to which information sufficient to enable those skilled in the art to use this invention is given in the before named Fellows patent, and other patents of Edwin R. Fellows and myself. It is enough for the present purposes to say that in the environment for use of the invention the shaft 53 is oscillated through a sufficient angle, and the gear 52 provided with a sufficient length of circumference to reciprocate the cutter through the distance necessary to generate gears of a given width of face and that the index gear 16 is rotated, in harmony with the rotation of the work piece at a relatively slow speed in proportion to the reciprocating speed of the cutter, such that successive cuts are made close to one another in the work.

Another feature of the invention has to do with changing the direction or line in which the spindle is displaced in its relieving motion. It is part of my contemplation to use such a cutter assemblage as that here described in a machine where the range of adjustment of the cutter saddle permits placement to cut either external or internal gears, as shown in Figs. 5 and 6, at either side of the axis of such a gear, as further shown by Figs. 7 and 8; and also to cut helical gears with either right hand or left hand leads. In most cases the cutter cannot be displaced from the work for relief in the line of centers, because of overlap or interference between the substance of the gear blank and one or more of the cutter teeth. In order therefore to avoid such interference in all cases, the relief motion is caused to take place on a line inclined at a small angle to the line of centers. The direction of such inclination is different as between cutters of which the generative movement is in left hand or right hand rotation, other things being equal, or as between external and internal work pieces, or as to locations of the cutter at relatively opposite sides of the center of the work piece. To take care of these various situations I have provided a plurality of springs 49 and their cooperative mounting means and plungers, suitably located on different radii of the spindle housing and having means by which all but one of them may be held out of action at any time. An illustrative means for thus disabling the springs individually, may consist of a knob or handle 66 secured to the outer end of each plunger 51 and a pin or shoulder 67 on the plunger arranged to be placed across an abutment portion of the spring housing when the plunger is pulled out and turned to one side; or to be received in a recess in the spring housing when the spring is put into action. Adjacent springs may be put in locations displaced from one another lengthwise of the spindle when there is not room to mount them side by side in the same transverse plane.

While I have described the invention thus far in terms of its application to the cutter carrying spindle of a gear shaping machine, and indeed such is the preferred embodiment and the one in which its utility is most pronounced, still I wish it to be understood that all other conditions, uses and combinations in which it may be operatively applied are within the scope of the protection which I claim for it.

What I claim and desire to secure by Letters Patent is:

1. In a shaping machine of the type in which a spindle is reciprocated and rotated for effecting certain components of the cutting and generating relative movement between a cutting tool and a work piece, a pivotal connection between the spindle and its rotation-imparting means, a laterally slidable thrust engagement between the spindle and its reciprocation-imparting means, complemental wedging and spring means acting on the spindle at a point remote from said pivotal connection, and means for actuating said wedging means to effect transverse displacement of the spindle at prescribed points in its reciprocative travel.

2. In a shaping machine, a carrier having alined guideways, a spindle reciprocatively mounted within said guideways; means for rotating said spindle including a pivotal connection arranged to permit angular movement of the spindle transversely of its length, mechanism for reciprocating the spindle, a cone surrounding the spindle in longitudinally slidable engagement therewith, a complemental encircling abutment in one of said guideways, and means for moving said cone longitudinally with respect to the encircling abutment into and out of the latter.

3. In a machine tool, a supporting structure, a spindle-rotating member rotatably mounted in said structure, a spindle in axial alinement with said rotating member and having a connection therewith constructed to transmit rotation and to permit angular movement of the spindle about a center in its axis and in all directions transverse to such axis, a guideway displaced from the said rotation applying element lengthwise of the spindle, having an internal reaction zone, through which the spindle passes, means for moving the spindle back and forth endwise within said guideway, a cone complemental to said internal zone surrounding the spindle with provision for independent movement endwise thereof, arranged to be brought into and out of bearing on said zone, and means for moving the cone into and out of bearing with the internal zone.

4. In a shaping machine, a rotatable and endwise movable spindle, means for reciprocating the spindle in the direction of its axis, means for rotating the spindle comprising a surrounding gear, one member of a ball and socket joint having a spherical bearing within said gear, complemental guides, one of which is secured to the spindle and the other to said joint member, means for transmitting rotation from the gear to said joint member around the axis of the spindle while permitting angular movement of the joint member about any axis perpendicular to the spindle axis, and means acting on the spindle at a point remote from the said rotation-transmitting means, organized to swing the spindle back and forth transversely of its axis.

5. In a shaping machine, a supporting structure having alined bearings or guides, a driving wheel rotatably supported in one of said guides, a sleeve slidably mounted in a second guide with provision for axial reciprocative movement, an internal cone mounted in a third guide remote from the driving wheel, a spindle passing coaxially through said driving wheel, sleeve and cone, a ball and socket joint and linear guides between the spindle and driving wheel, thrust bearings between the sleeve and spindle having spherical contact faces concentric with said ball and socket joint, an externally conical sleeve slidingly mounted on the spindle in position to coact with said internal cone, mechanisms organized to reciprocate said sleeves independently of one another, and means for yieldingly applying pressure laterally to the spindle at a point distant from the ball and socket joint.

6. In a shaping machine having a reciprocative and rotatable spindle, means for rotating the spindle while permitting a guided longitudinal movement thereof and a lateral angular movement about an axis intersecting the spindle axis, comprising complemental linear guides, one of which is fixed to the spindle, a ball member surrounding the spindle to which the other of said complemental guides is secured, a driving gear surrounding the ball member and mounted to rotate, having a socket bearing complemental to spherical zones of the ball member, and a plurality of interengaging abutment elements between said gear and ball member in a plane perpendicular to the spindle axis and containing the center of said ball member; said abutments being fitted to prevent substantially any relative movement in said plane while permitting relative movement in planes containing the axis of the spindle.

7. In a shaping machine, the combination with a supporting structure having a guideway, of a sleeve mounted in said guideway with provision for endwise reciprocation therein, a spindle passing through said sleeve in substantial axial alinement therewith and of smaller diameter than the bore of the sleeve, a rotational driving wheel surrounding the spindle in rotation-transmitting and guided sliding connection therewith, having provisions for permitting a relative angular movement of the spindle about an axis transverse to the spindle axis, thrust bearings between the spindle and endwise movable sleeve organized to transmit reciprocating motion from the latter to the former substantially without backlash and having slidable contact surfaces substantially concentric with the center of transverse angular movement of the spindle, and means for displacing the spindle laterally about its center of angular oscillation.

8. In a shaping machine, the combination with a supporting structure having a guideway, of a sleeve mounted in said guideway with provision for endwise reciprocation therein, a spindle passing through said sleeve in substantial axial alinement therewith and of smaller diameter than the bore of the sleeve, a rotational driving wheel surrounding the spindle in rotation-transmitting and guided sliding connection therewith, having provisions for permitting a relative angular movement of the spindle about an axis transverse to the spindle axis, thrust bearings between the spindle and endwise movable sleeve organized to transmit reciprocating motion from the latter to the former substantially without backlash and having slidable contact surfaces substantially concentric with the center of transverse angular movement of the spindle, and means for displacing the spindle laterally about its center of angular oscillation organized to effect such displacements alternately in two opposite directions at the ends of the longitudinal spindle strokes in each direction.

9. In a shaping machine, the combination with a spindle and means for reciprocating and rotating the spindle, of connections between the spindle and spindle rotating means organized to permit angular displacement of the spindle about axes transverse to its own axis, complemental conical wedging means organized to locate the spindle in a given translative path and to permit displacement of the spindle laterally from such path, and a plurality of spring means arranged to exert force on said spindle in different radial directions, said spring means having provisions for disabling each of them independently of the others.

10. In a shaping machine, the combination of a spindle, means for reciprocating and rotating said spindle, and provisions for permitting a lateral displacement of the spindle with respect to the directions of its reciprocating movement, complemental relatively movable wedging elements on the spindle and on an adjacent non-displaceable part of the machine organized to locate the spindle in a given path and to permit displacement of the spindle from such path, a spring adapted to act on the spindle with tendency to displace it in one direction when and as permitted by such wedging means, a second spring adapted to exert a like action in a different direction, and independent means associated with each spring for putting such spring into or out of action.

11. A shaping machine comprising a lengthwise movable cutter spindle, a spindle-rotating member surrounding the spindle, relatively slidable torque transmitting guide means between the spindle and spindle-rotating member including means permitting transverse swinging movement of the spindle relatively to said rotation transmitting member, a cutter secured to the spindle at a point distant from the rotation transmitting member, a sleeve fitted slidingly on the spindle at a distance from the rotation transmitting member, having an external conical zone concentric with the spindle, through which sleeve the spindle is movable endwise, a stationary guide embracing said sleeve and having an abutting portion complemental to said conical zone, means for reciprocating the spindle endwise, and means for withdrawing said sleeve from, and advancing it into, engagement with said abutting portion in time with the reciprocations of the spindle.

12. In a shaping machine of the type in which a cutting action is performed by relative reciprocating movements between a cutter and a work piece, the combination with an endwise movable spindle and means for reciprocating it endwise, of a sleeve surrounding said spindle and with which the spindle has a closely fitting sliding engagement, a stationary guide embracing said sleeve and with respect to which the sleeve is movable back and forth endwise, said sleeve and guide having complemental abutting surfaces inclined to the direction of movement of the sleeve, and means for advancing and withdrawing the sleeve in a manner to cause alternate engagement and disengagement of said abutting surfaces, in time with the reciprocations of the spindle such that, during movements of the spindle in one direction it is constrained to travel in a prescribed path, and during its movements in the opposite direction it is enabled to travel in a different path.

13. In a shaping machine having a rotatable and axially movable spindle, a spindle-rotating member surrounding the spindle coaxially, a spherical member surrounding the spindle having an external spherical bearing within said spindle-rotating member, slidable guide means between said spherical member and the spindle constructed to transmit torque to the spindle while permitting independent endwise movement thereof, and torque transmitting means between the spindle rotating member and the spherical member having provisions for permitting relative angular movement of the spherical member about axes perpendicular to the axis of the spindle.

14. In a shaping machine having a rotatable and axially movable spindle, a spindle-rotating member surrounding the spindle coaxially, torque transmitting means between said member and the spindle including a ball and socket joint and relatively slidable guide means, whereby the spindle is enabled to reciprocate endwise and to swing sidewise relatively to the rotation transmitting member, combined with spindle reciprocating means and means engaging the spindle at a distance from said rotating member, having provisions for causing lateral swinging movement of the spindle with respect to said member.

15. A shaping machine comprising a lengthwise movable cutter spindle, a spindle-rotating member surrounding the spindle, torque transmitting means between said member and the spindle including a ball and socket joint and relatively slidable guide means whereby the spindle is enabled to reciprocate endwise and to swing sidewise relatively to the rotation transmitting member while remaining in torque receiving connection therewith, a rack extending parallel with said spindle in connection therewith to transmit reciprocation thereto when itself is reciprocated endwise, a gear element in mesh with said rack, and means for oscillating said gear element to reciprocate the rack.

16. A shaping machine comprising a lengthwise movable cutter spindle, a spindle-rotating member surrounding the spindle, torque transmitting means between said member and the spindle including a ball and socket joint and relatively slidable guide means whereby the spindle is enabled to reciprocate endwise and to swing sidewise relatively to the rotation transmitting member while remaining in torque receiving connection therewith, and means for reciprocating the spindle independently of said ball and socket joint, said last named means having a connection with the spindle permitting the latter to swing about the center of the ball and socket joint.

EDWARD W. MILLER.